US011427360B2

(12) United States Patent
Draghetti

(10) Patent No.: US 11,427,360 B2
(45) Date of Patent: Aug. 30, 2022

(54) PACKAGING MACHINE

(71) Applicant: I.M.A. INDUSTRIA MACCHINE AUTOMATICHE S.P.A., Ozzano dell'Emilia (IT)

(72) Inventor: Fiorenzo Draghetti, Ozzano Dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 194 days.

(21) Appl. No.: 16/489,341

(22) PCT Filed: Feb. 27, 2017

(86) PCT No.: PCT/IT2017/000037
§ 371 (c)(1),
(2) Date: Aug. 27, 2019

(87) PCT Pub. No.: WO2018/154611
PCT Pub. Date: Aug. 30, 2018

(65) Prior Publication Data
US 2020/0010226 A1    Jan. 9, 2020

(51) Int. Cl.
*B65B 19/22* (2006.01)
*B29C 65/00* (2006.01)
(Continued)

(52) U.S. Cl.
CPC ...... *B65B 19/223* (2013.01); *B29C 66/43121* (2013.01); *B29C 66/849* (2013.01);
(Continued)

(58) Field of Classification Search
CPC ... B65B 19/223; B65B 19/225; B65B 19/226; B65B 19/24; B65B 19/245;
(Continued)

(56) References Cited

U.S. PATENT DOCUMENTS 2,720,738 A * 10/1955 Brightwell ............ B65B 19/223
53/133.5
3,735,767 A *  5/1973 Kruse ..................... B65B 19/28
131/283
(Continued)

FOREIGN PATENT DOCUMENTS

DE    102014010422 A1 *  1/2016  .......... B65B 19/025
EP      0 463 360 A1      1/1992
(Continued)

OTHER PUBLICATIONS

International Search Report and Written Opinion for PCT/IT2017/000037, dated Feb. 16, 2018.

*Primary Examiner* — Joshua G Kotis
(74) *Attorney, Agent, or Firm* — Marshall, Gerstein & Borun LLP

(57) ABSTRACT

A packaging machine to make an airtight wrapper includes a wrapping sheet wrapped airtight around a structured assembly consisting of an organized group of smoking articles associated with a reinforcement insert. The reinforcement insert includes, in working sequence on one or (Continued)

more cyclical conveyor devices of the wheel or carousel type, a structured assembly formation unit, a combination unit suitable to combine the structured assembly with said wrapping sheet, a wrapping sheet work unit and a welding unit.

22 Claims, 9 Drawing Sheets

(51) Int. Cl.
  *B65B 11/32*  (2006.01)
  *B65B 19/24*  (2006.01)
  *B65B 49/00*  (2006.01)
  *B65B 19/02*  (2006.01)
  *B65B 11/30*  (2006.01)
  *B29L 31/00*  (2006.01)

(52) U.S. Cl.
  CPC .............. *B65B 11/30* (2013.01); *B65B 11/32* (2013.01); *B65B 19/02* (2013.01); *B65B 19/22* (2013.01); *B65B 19/24* (2013.01); *B65B 49/00* (2013.01); *B29L 2031/712* (2013.01); *B29L 2031/7416* (2013.01)

(58) Field of Classification Search
  CPC . B65B 19/025; B65B 11/28–32; B65B 11/48; B65B 2220/18; B65B 19/02; B65B 19/22; B29L 2031/7416
  See application file for complete search history.

(56) References Cited

U.S. PATENT DOCUMENTS

| | | | | |
|---|---|---|---|---|
| 3,978,639 | A * | 9/1976 | Ferrozzi ................. | B65B 11/58 53/449 |
| 4,073,123 | A * | 2/1978 | Schoppee .............. | B65B 11/12 53/387.2 |
| 4,079,575 | A * | 3/1978 | Focke ..................... | B65B 11/30 53/148 |
| 4,571,917 | A * | 2/1986 | Wheless ................. | B65B 19/08 131/283 |
| 8,276,750 | B2 * | 10/2012 | Biondi ................... | B65D 77/02 206/259 |
| 2009/0077929 | A1 * | 3/2009 | Bertuzzi ................ | B65B 19/20 53/420 |
| 2009/0288371 | A1 * | 11/2009 | Squarzoni ............. | B65B 19/226 53/456 |
| 2012/0031041 | A1 * | 2/2012 | Draghetti ............... | B65B 49/08 53/148 |
| 2012/0031044 | A1 * | 2/2012 | Draghetti ............... | B65B 11/16 53/203 |
| 2012/0241339 | A1 * | 9/2012 | Buse ................. | B65D 85/1045 206/268 |

FOREIGN PATENT DOCUMENTS

| | | |
|---|---|---|
| EP | 0 739 819 A1 | 10/1996 |
| WO | WO-2016/0166141 A1 | 10/2016 |

* cited by examiner

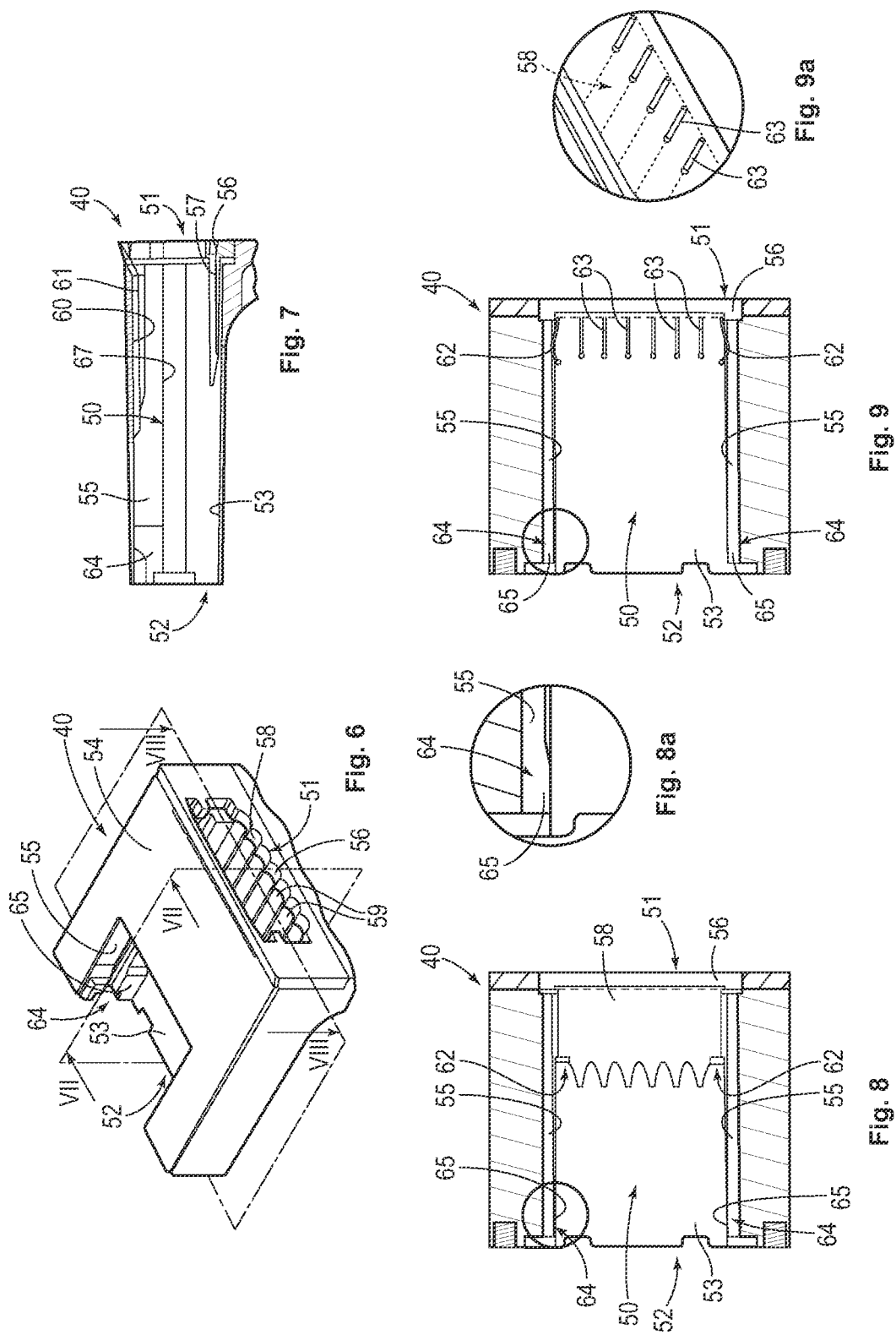

PACKAGING MACHINE

FIELD OF THE INVENTION

The present invention concerns a packaging machine usable in the field of packets for smoking articles. In particular, the packaging machine is the type suitable to obtain an airtight wrapper of the gusset type.

BACKGROUND OF THE INVENTION

Smoking articles are traditionally packed in rigid or semi-rigid packets, inside which the smoking articles are wrapped in an internal wrapper, generally made of tinfoil.

Normally, in cooperation with the internal wrapper there is a reinforcement insert.

This form of wrapper is a compromise solution between the production costs and the need to keep the aromatic characteristics of the tobacco in the smoking articles unchanged.

In order to better preserve the qualities of the smoking articles, there is a growing need to produce a sealed internal wrapper, that is, obtained with a sheet made of a material that does not let the air pass and is suitably sealed around the smoking articles contained therein.

The present invention is connected to technical solutions and operating methods that have already been protected by patents. However, the patent protection covers solutions that, structurally and functionally, are not able to define a result suitable for the desired purpose and within the required terms.

The general technical problem to be solved therefore consists in producing an airtight wrapper that contains a structured assembly consisting of an organized group of smoking articles in the desired number and reciprocal position and a reinforcement insert.

The general technical problem consequently raises specific and interdependent technical problems which the previous solution does not deal with, or deals with unsatisfactorily.

Likewise, the methods provided are not satisfactory either.

A first technical problem is to obtain a stable structured assembly, easy to handle, consisting of an organized group of smoking articles associated with a reinforcement insert with a positioning and delimiting function.

A second technical problem is to wrap said structured assembly in a suitable and dedicated way with a pre-formed wrapping paper, folding it in a desired and appropriate manner around the structured assembly, obtaining a pre-wrapper.

A third technical problem consists in sealing the pre-wrapper to obtain an airtight wrapper containing the structured assembly.

Purpose of the present invention is to make the salient components of a packaging machine, and also the corresponding and connected operating methods to obtain, sequentially and continuously, the structured assembly, the pre-wrapper and the airtight wrapper.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

The present invention concerns a packaging machine and some of its dedicated operating units. The invention also comprises the connected working method.

The individual units and their functional assembly are suitable to obtain an airtight wrapper containing inside it a structured assembly consisting of a reinforcement insert associated with an organized group of smoking articles, which occupies the least possible space in relation to the content. The airtight wrapper is sealed correctly and thoroughly, is esthetically pleasing and, possibly, made accessible on each occasion to the inside.

The structured assembly is obtained using a reinforcement insert folded in a U shape, to which the smoking articles are associated layer by layer or entirely.

The reinforcement insert is obtained from a pre-formed sheet of cardboard, folded so as to define a base wall and two lateral walls, or fins that extend parallel to each other from the base wall, and which, during use, define the lateral containing walls of the organized group of smoking articles, as well as at least one support and abutment edge.

The airtight wrapper is obtained from a pre-formed sheet of heat-weldable material which is first pre-positioned with respect to the structured assembly and then suitably folded to completely wrap the structured assembly, to be finally stably sealed by welding.

The airtight wrapper can provide, inside its perimeter and in a suitable position, an aperture that is temporarily closed by a label or a tongue, possibly the adhesive type and re-usable.

The packaging machine, for what concerns us here, comprises a unit suitable to form a structured assembly, or structured assembly formation unit.

The packaging machine also comprises, in functional sequence, a dedicated combination unit of the structured assembly with a wrapping paper to obtain an intermediate combination between the wrapping paper and the structured assembly.

The intermediate combination is then worked in a unit that works and folds the wrapping paper, in which the wrapping sheet is folded in a desired manner around the structured assembly and welded in position to obtain a manipulable whole.

The manipulable whole is then subjected to desired and consequential folding to obtain a pre-wrapper provided with longitudinal layers that extend from the lateral walls of the structured assembly.

The manipulable whole is worked in a unit that defines the longitudinal layers, followed by a welding unit suitable to generate the necessary welds to obtain the airtight wrapping.

The various units, as identified above in relation to the dedicated operations, are then developed, integrating them with the connected operating method according to the present invention.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, together with the connected methods, given as a non-restrictive example with reference to the attached drawings wherein:

FIG. 6 is a schematic perspective view of a pocket in accordance with embodiments of the present invention;

FIG. 7 is a section along the plane VII-VII of FIG. 6;

FIG. 8 is a section along the plane VIII-VIII of FIG. 6;

FIG. 8a is an enlarged detail of FIG. 8;

FIG. 9 shows a section along the plane VIII-VIII of FIG. 6 according to a variant;

FIG. 9a shows an enlarged detail of FIG. 9;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
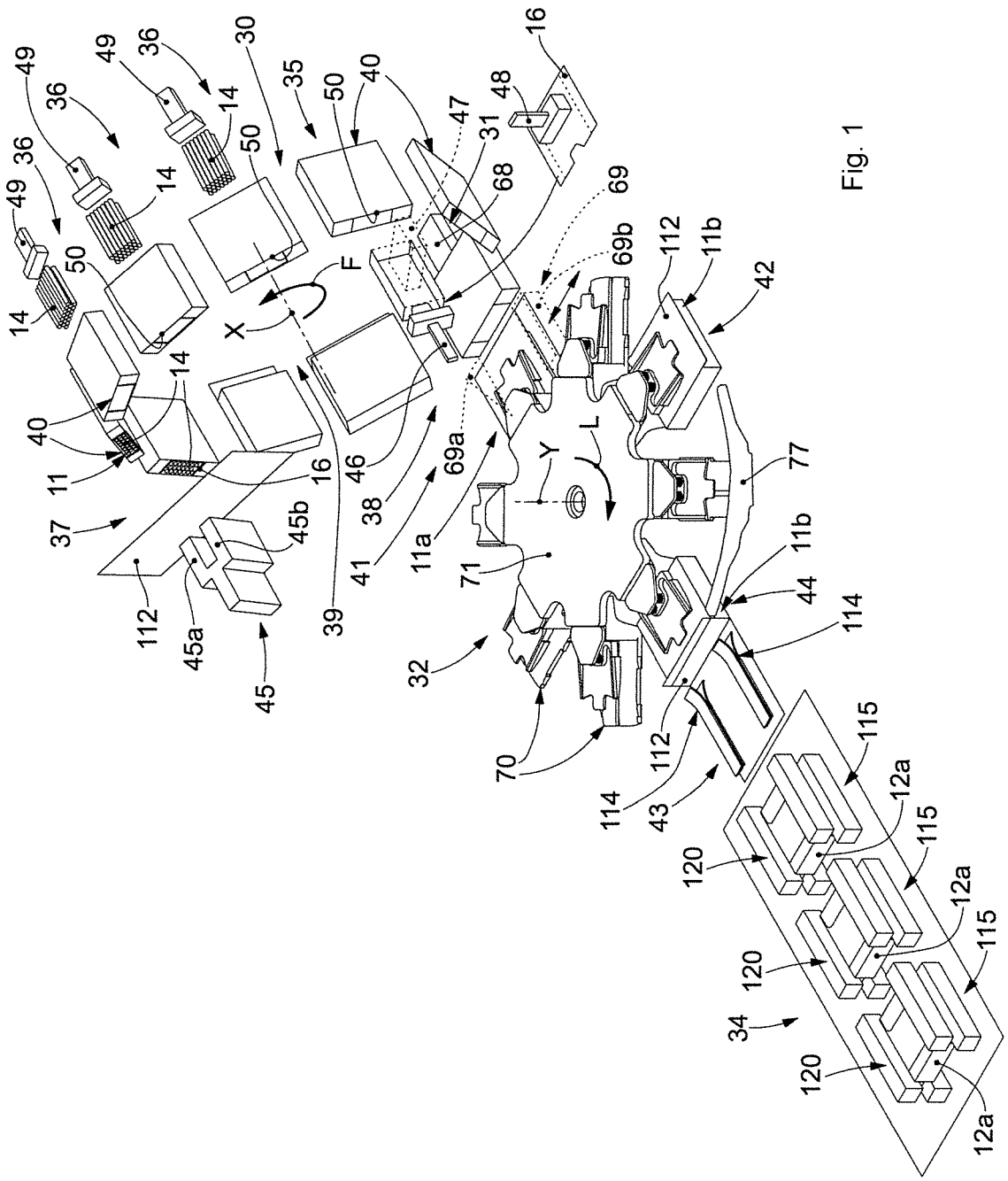
FIG. 1 is a schematic perspective view of a packaging machine in accordance with embodiments of the present invention.
Figure 2:
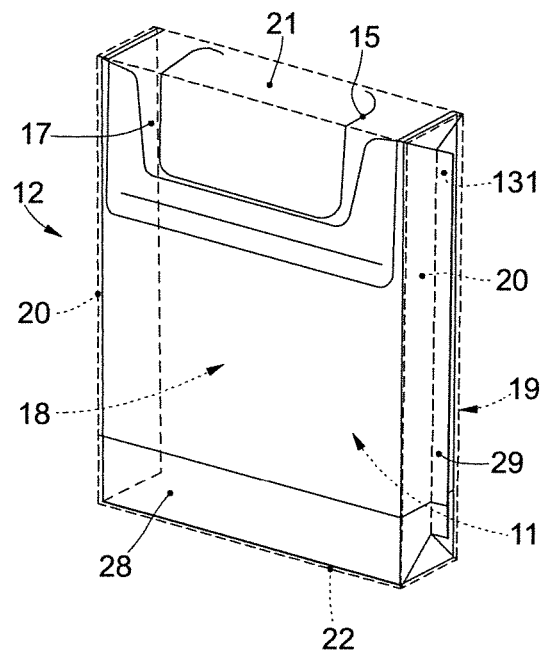
FIG. 2 is a three-dimensional schematic view of a wrapper.

Embodiments described here with reference to FIG. 1 concern a packaging machine 10 suitable to obtain an airtight wrapper 12 of the type previously described and illustrated by way of example in FIG. 2.

Figure 3:
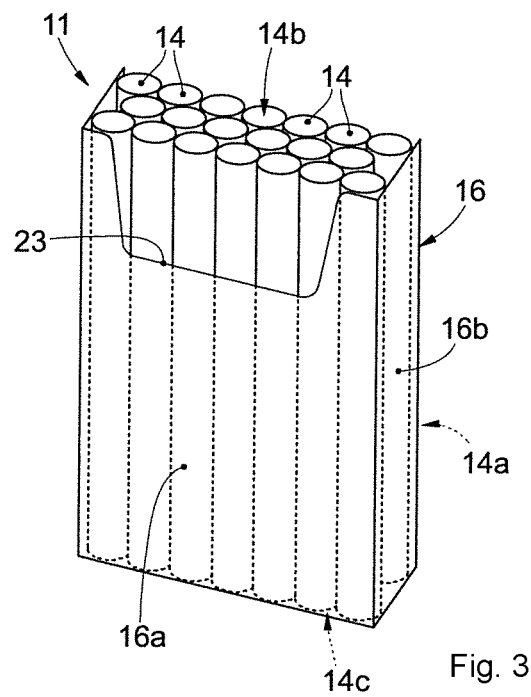
FIG. 3 is a three-dimensional view of an assembly given by the combination of a reinforcement insert wrapped partly around a group of smoking articles.

With reference to FIGS. 2 and 3, the airtight wrapper 12 contains inside it a structured assembly 11, consisting of an organized group of smoking articles 14 and a reinforcement insert 16.

According to the embodiment shown in FIG. 3, the reinforcement insert 16 is disposed so as to surround the smoking articles 14 on three sides.

The reinforcement insert 16 has a base wall 16a and two lateral fins, or walls 16b in continuity with the base wall 16a, which respectively define a first base wall 16a and the lateral walls 16b of the structured assembly 11.

In the structured assembly 11 there is also a second base wall 14a, defined by the lateral surfaces of the smoking articles 14 in their longitudinal development, and two walls, head 14b and bottom 14c, defined by the two heads of the smoking articles 14.

The base wall 16a in this case has a shaped edge or collar 23, which can cooperate in the airtight wrapper 12 with an extraction aperture 15 to extract the smoking articles 14 possibly present first in a wrapping sheet 112 and then in the airtight wrapper 12.

The airtight wrapper 12 comprises a bigger front lateral wall 18, which cooperates with the base wall 16a, a bigger rear lateral wall 19, which cooperates with the second base wall 14a defined by the smoking articles 14, and smaller lateral walls 20 defined by four lateral longitudinal flaps which cooperate two by two with the lateral walls 16b.

The airtight wrapper 12 also comprises an upper wall 21 and a lower wall 22 that are respectively associated with the smaller lateral walls 14b, 14c, at the same time connecting with each other in an airtight manner.

In the solution shown in FIG. 2, the airtight wrapper 12 has the aperture 15 to extract the smoking articles 14, which can be closed, even repeatedly, by a re-usable adhesive closing label 17.

The airtight wrapper 12 is obtained with a wrapping sheet 112 (FIG. 4) which in this specific case is already equipped with the pre-cut extraction aperture 15 and with the re-usable adhesive closing label 17.

Providing the extraction aperture 15 pre-cut, but with the cap left in place, allows to use a completely adhesive closing label 17, simplifying the disposition and application of the closing label 17.

Figure 4:
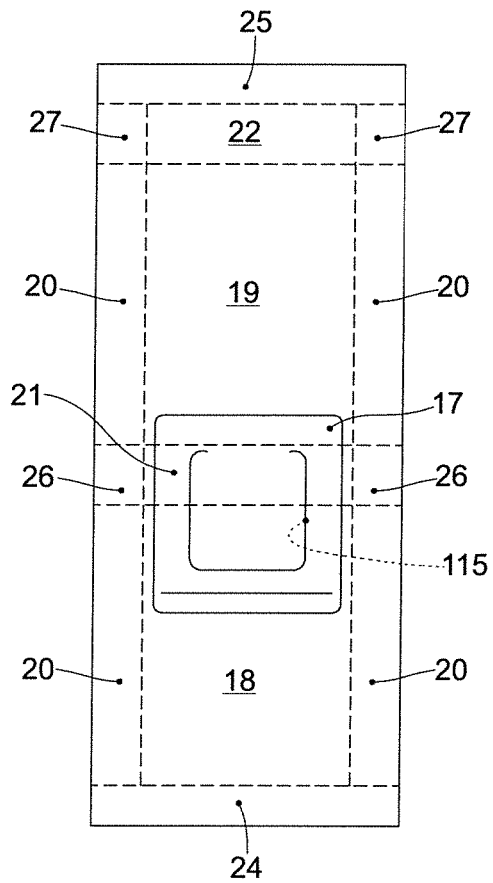
FIG. 4 is a schematic view of a wrapping sheet, with the flaps and folds indicated that form during folding around an assembly.

FIG. 4 shows the wrapping sheet 112 and the zones that will respectively cooperate with the walls of the structured assembly 11.

The flaps 24, 25 are also indicated, which are welded after the application of the wrapping sheet 112 on the structured assembly 11 to obtain a manipulable whole 11b and the lateral flaps 26, 27 that are folded against the lateral walls 16b of the structured assembly 11.

Figure 5A:
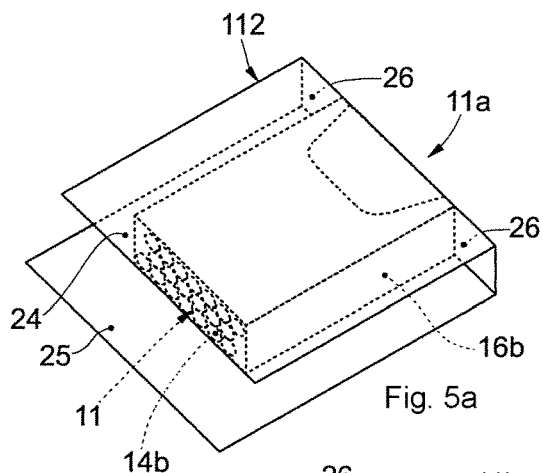
FIGS. 5a-5g schematically show the folding steps of the wrapping sheet of FIG. 4 around the assembly of FIG. 3.

In a first step the wrapping sheet 112 is associated with the base walls 14a, 16a and with the head wall 14b of the structured assembly 11, defining an intermediate combination 11a (FIG. 5a).

In a second step (FIG. 5b) in the case shown here, the lower wall 22 of the wrapping sheet 112 is associated with the bottom wall 14c of the structured assembly and the flaps 24 and 25 are welded to each other, generating a welded fin or transverse edge 28, and obtaining a manipulable whole 11b.

Figure 5B:
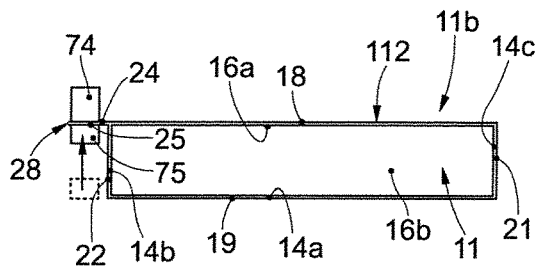
Figure 5C:
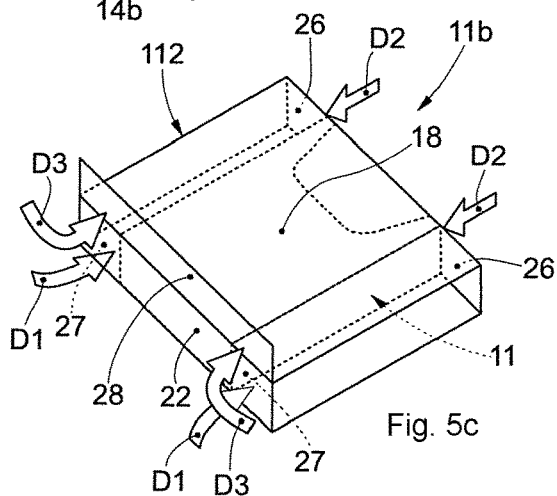

From the manipulable whole 11*b* we pass to a pre-wrapper 12*a*, folding the welded transverse edge 28 upward and making it rest on the bigger front lateral wall 18 (FIG. 5*c*).

Figure 5D:
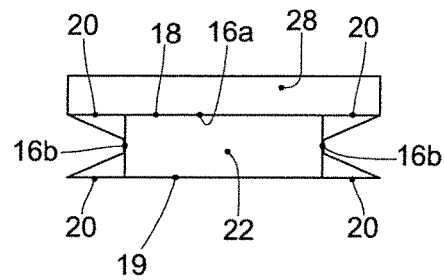

Then the folds are made, advantageously triangular, of the four lateral flaps 26, 27 with respect to the lateral walls 16*b* of the structured assembly 11 (FIGS. 5*c* and 5*d*).

Figure 5E:
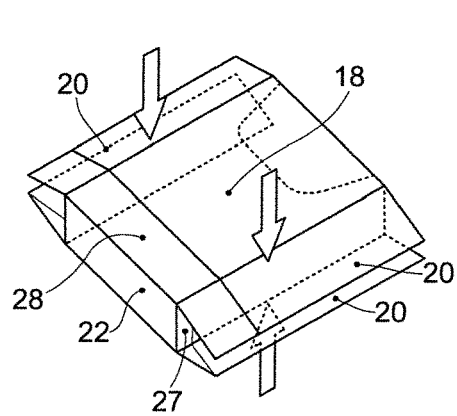
Figure 5F:
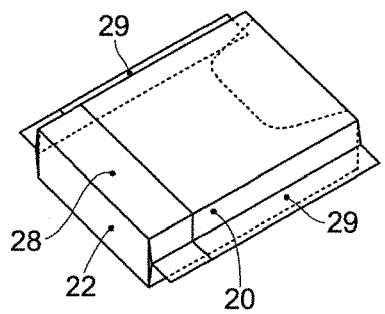

Subsequently, the longitudinal lateral flaps 20 of the wrapping sheet 112 are folded, so as to create the cover of the lateral walls 16*b* of the structured assembly 11 (FIG. 5*e*), at the same time generating opposite longitudinal layers 29, making them suitable to be welded (FIG. 5*f*).

The opposite longitudinal layers 29 generated in relation to the lateral walls 16*b* of the structured assembly 11 are then associated in an airtight manner by welding (FIG. 5*g*), and advantageously at the same time, the transverse edge 28, previously welded, is integrated and clamped.

In this way the airtight wrapper 12 is obtained, containing the desired organized group of smoking articles 14 and the reinforcement insert 16.

The machine 10 generically known from the cited patent protection is configured with a plurality of dedicated units, also functionally coordinated.

In order, for what concerns us here, the machine 10 comprises a unit 30 to form the structured assembly 11, followed by a combination and transfer unit 31 intended to combine the structured assembly 11 with a wrapping sheet 112, obtaining the intermediate combination 11*a* and to transfer the intermediate combination 11*a* to a station 38 to grip and position the intermediate combination 11*a* which thus becomes structured.

There then follows a unit 32 to work the wrapping sheet, intended to confer on the wrapping sheet 112 an intermediate shape defined around the structured assembly 11, partly surrounding it.

The unit 32 to work the wrapping sheet provides an intermediate welding station 42 that welds together the flaps 24 and 25 previously left free, obtaining the manipulable whole 11*b*.

Downstream of the intermediate welding station 42 there is a definitive folding station 44, in which a folding unit 90 is disposed, which obtains the practically complete and definitive folding of the wrapping sheet 112 around the structured assembly 11, obtaining the longitudinal layers 29; the folding unit 90 allows to obtain the pre-wrapper 12*a*.

The pre-wrapper 12*a* then passes to a welding unit 34 that stabilizes the connections of the longitudinal layers 29, possibly also associating the transverse edge 28, thus making the airtight wrapper 12 definitively airtight.

Between the folding station 44 and the welding unit 34 there can be an intermediate station 43 to define the longitudinal folds that define the longitudinal layers 29.

We will now describe every individual unit or station in its structure and operating behavior.

The formation unit 30 which allows to obtain the structured assembly 11 provides a conveyor device 39 having its own advance, in this case step-wise, and provided with a plurality of pockets 40 to form the structured assembly 11.

The pockets 40 are moved along a formation path F defined by specific work stations.

In case shown by way of example here, the conveyor device can be or can comprise a wheel 39 provided with a plurality of specialized pockets 40.

According to a variant, the wheel 39 could be replaced by a linear carousel or a linear conveyor.

Hereafter in the description we will refer by way of example to the wheel 39, but the description can be transferred to any type of displacement of the pockets 40.

In the example, the wheel 39 is configured to rotate on a substantially vertical plane around a horizontal axis of rotation X along the formation path F, with every step taking a pocket 40 into correspondence with a specific work station.

It is within the spirit of the invention to describe a station in the wheel 39, with the repetitions required by the production capacity being included.

According to some embodiments, a first insert introduction station 35 is provided, in which a reinforcement insert 16 is introduced into the chamber 50 of a formation pocket 40.

According to some embodiments, in the insert introduction station 35 a pick-up head 48 can be provided, configured to pick up a reinforcement insert 16 and deliver it to an introduction member 46 configured to introduce the reinforcement insert 16 into the chamber 50.

According to some embodiments, it can be provided that the reinforcement insert 16 is already U-shaped, ready to be introduced into the chamber 50.

According to a variant, it can be provided that the reinforcement insert 16 is fed to the insert introduction station 35 in its flat conformation. For example, a pile of already pre-cut reinforcement inserts 16 can be provided, or devices can be provided configured to cut on each occasion a reinforcement insert 16 from a reel of cardboard or other suitable material.

In this case the pick-up head 48 can deliver the reinforcement insert 16 in the flat conformation to a deformer device 47, which folds the lateral fins 16*b* with respect to the base wall 16*a*, defining the U shape.

The deformer device 47 can also be configured to keep the reinforcement insert 16 in position during the action of the introduction member 46 which then delivers the reinforcement insert 16, already folded, to the formation pocket 40, positioning it therein.

Downstream of the insert introduction station 35, along the formation path F, at least one introduction station 36 of the smoking articles is provided, in which the desired organized group of smoking articles 14 is introduced into the chamber 50 into which the reinforcement insert 16 has already been introduced, so as to obtain the structured assembly 11.

The organized group of smoking articles 14 can also be obtained in two or more subsequent stations, inserting the subsequent layers of smoking articles 14 into the chamber 50 until the organized group has been obtained.

Depending on the production capacity required of the machine 10, there can be one or more than one stations 36 to introduce the smoking articles. By way of example, FIG. 1 shows three stations 36 to introduce the smoking articles, in each of which an organized group of smoking articles 14 can be introduced into the chamber 50 of a respective pocket 40.

Once the structured assembly 11 is made in the chamber 50, it is moved to a wrapping sheet feed station 37, where the wrapping sheet 112, already pre-cut and prepared according to requirements, is fed.

The wrapping sheet 112 is applied by a feed device 45 on the external part of the chamber 50, shaping it as a U. According to these embodiments, the base of the U, where provided, can have the adhesive closing label 17 already applied.

Downstream of the wrapping sheet feed station 37, there is also an exit station 38 for the assembly, in which the structured assembly 11 is expelled from the chamber 50 of the respective formation pocket 40 and simultaneously is combined directly with the wrapping sheet 112, thus forming the intermediate combination 11a.

According to some embodiments, each smoking articles introduction station 36 can cooperate with a feed hopper of the smoking articles 14, not shown, configured to feed organized groups or successive layers of smoking articles 14, in the desired number and reciprocal position.

In correspondence with each smoking articles introduction station 36 there is also a thruster member 49 configured to thrust the organized group or layer of smoking articles 14 and to introduce them into the chamber 50 of a respective pocket 40 of the wheel 39.

According to some embodiments, the smoking articles 14 are introduced into the chamber 50 in a parallel direction but in an opposite sense to the direction of introduction of the reinforcement insert 16.

According to some embodiments, in the wrapping sheet feed station 37 a gripping head or other pick-up member can be provided, not shown here, suitable to pick up a wrapping sheet 112, already cut in the desired shape, from a pile of wrapping sheets 112 or by a device configured to cut on each occasion a wrapping sheet 112 with the desired shape and size from a reel of suitable material.

The gripping or pick-up head can be configured to deliver the wrapping sheet 112 laid flat to the feed device 45, which applies it on the pocket 40 outside the chamber 50.

According to possible embodiments, the feed device 45 can be U-shaped, with two arms 45a, 45b which extend parallel and opposite, at a distance coherent with the height of the external walls of the chamber 50.

The feed device 45 slides with its arms 45a, 45b on the external walls of the chamber 50 and so doing it draws the wrapping sheet 112, present inside it, shaping it as a U with the bottom of the U positioned in correspondence with the heads of the smoking articles 14.

The wrapping sheet 112 is disposed with the portion that defines the upper wall 21 in correspondence with the head wall 14b of the structured assembly 11, with the lower flap 25 offset with respect to the upper flap 24 by a length coherent with the bottom wall 22.

According to some embodiments, the wrapping sheet 112 is advantageously positioned on the pocket 40 in an asymmetrical position, in this case with the lower edge 25 protruding beyond the upper edge 24.

According to other embodiments, the combination and transfer unit 31 cooperates with the structured assembly exit station 38.

According to some embodiments, the combination and transfer unit 31 can comprise a thruster device 68 suitable to cooperate with the pocket 40 to expel from the respective chamber 50 the structured assembly 11, combine it with the wrapping sheet 112 and transfer the intermediate combination 11a thus obtained to a gripping member 70 disposed in a possible entrance station 41 of the wrapper working unit 32 disposed downstream.

According to some embodiments, the combination and transfer unit 31 can comprise a counter-thruster, not shown, cooperating with the thruster device 68 to control the correct advance and positioning of the intermediate combination 11a during the translation from the pocket 40 to the gripping member 70, so that the intermediate combination 11a is not decoupled.

The thruster device 68 can act for example against the bottom wall 14c of the structured assembly 11, while the counter-thruster can cooperate with the upper wall 22 of the wrapping sheet 112.

According to some embodiments, the counter-thruster can function as an end-of-travel element for the intermediate combination 11a in the gripping member 70.

According to some embodiments, the pocket 40 has the chamber 50 with a substantially rectangular section, defined by a lower wall 53, an upper wall 54 and lateral walls 55, and having a first introduction mouth 52 and a second introduction mouth 51, opposite each other and in practice coaxial.

The first introduction mouth 52 in this case serves to introduce the folded reinforcement insert 16.

According to some embodiments, the reinforcement insert 16 is advantageously introduced into the chamber 50 before the smoking articles 14.

The first introduction mouth 52 is then used to make the structured assembly 11 exit.

The second introduction mouth 51 in this case serves to introduce the smoking articles 14 as an organized group, or layer by layer.

The first introduction mouth 52 cooperates with the lower 53 and upper 54 walls of the chamber 50, which have a very limited thickness.

In this way, during the combination of the wrapping sheet 112 and the structured assembly 11, the wrapping sheet 112 is shaped substantially correctly on the structured assembly 11, without incorrect and undefined folds being generated.

According to some embodiments, the lower wall 53 has a length coherent with the length of the smoking articles 14 and/or the reinforcement insert 16, so as to contain both, reciprocally and correctly positioned.

The second introduction mouth 51, before the seating where the reinforcement insert 16 and smoking articles 14 are associated in a reciprocal position, advantageously has positioning means configured to keep the reinforcement insert 16 and smoking articles 14 in the correct reciprocal position.

The positioning means can comprise an introduction base 56, possibly provided with introduction seatings 59 that confirm the desired position of the first layer of smoking articles 14.

The introduction base 56 and/or the introduction seatings 59 can define a lead-in for the smoking articles 14, facilitating their introduction into the chamber 50.

According to a variant, on the roof of the chamber 50 there is an upper positioning base 60, possibly provided with coordinated positioning seatings 61. The latter are advantageously disposed in a position coherent with the introduction seatings 59 depending on the number and/or disposition of the smoking articles 14 in the organized group.

In axis with the introduction seatings 59 a lower positioning base 58 can be provided, also possibly provided with the introduction seatings 59 which not only position the lower layer of the smoking articles 14 with the introduction seatings 59 that it defines, also obliges the reinforcement insert 16 to adopt a univocal position, not interfering with the smoking articles 14 in their introduction step.

According to some embodiments, the lower positioning base 58 can be disposed slightly distanced from the bottom wall 53 of the chamber 50, so as to define an interspace 57 inside which at least the front portion of the base wall 16a of the reinforcement insert 16 can be inserted.

The lower positioning base 58 can extend only for a minimum portion of the chamber 50, so as to keep the reinforcement insert 16 and the smoking articles 14 separate only in correspondence with the second introduction mouth 51, while the reinforcement insert 16 and smoking articles 14 are associated with each other in the remaining larger portion of the chamber 50, to define the structured assembly 11.

According to some embodiments, inside the chamber 50, along the reinforcement insert 16 introduction path, there are spreader members 62 configured to spread the lateral fins 16b in the zone of the second introduction mouth 51, so that they do not interfere during the introduction of the smoking articles 14.

According to some embodiments, the spreader members 62 can be defined by the lateral front parts of the positioning base 58, facing toward the inside of the chamber 50, or with other deflection/spreader means.

According to some embodiments, it can be provided that the lateral walls 55 are slightly inclined, spread apart with respect to each other between the bottom wall 53 and the upper wall 54, by an angle greater than 90°.

According to a variant, it can be provided that the lateral walls 55 are provided with hollows suitable to contain the lateral fins 16b disposed inclined and spread with respect to the base wall 16a.

According to a variant, shown by way of example in FIGS. 9 and 9a, instead of the lower positioning base 58, in relation to the positioning seatings 59, blades or shaped needles 63 can be provided (FIGS. 9 and 9a) positioned in relation to the contact zone between one smoking article 14 and another.

The shaped needles 63 perform the same function as the lower base 58, that is, they position the reinforcement insert 16 vertically and possibly laterally, so that it does not interfere with the smoking articles 14 during their introduction into the chamber 50.

According to other embodiments, the first introduction mouth 52 includes lateral positioning means 64 of the lateral fins 16b of the reinforcement insert 16, so that in this zone the lateral fins 16b are substantially straight, and are inclined toward the roof of the chamber 50 by a little more than 90°.

According to possible solutions, the lateral positioning means 64 comprise lateral projections protruding progressively from the lateral walls 55 toward the inside of the chamber 50, so as to confer on the chamber 50 a tapered shape from the second introduction mouth 51 of the smoking articles 14 to the first introduction mouth 52 of the reinforcement insert 16.

This positioning functions as a lateral containment of the group of smoking articles 14 during the extraction of the structured assembly 11, facilitating it.

Thanks to the internal conformation of the chamber 50 as described above, the structured assembly 11 is already formed in the chamber 50, when the group of smoking articles 14 is also introduced therein and defined.

Consequently, when the structured assembly 11 is extracted by the expeller device 68, the organized group of smoking articles 14 and the reinforcement insert 16 are substantially not subjected to any reciprocal displacement, since the structured assembly 11 is already defined inside the chamber 50.

At the sides, the chamber 50 advantageously has, in this case, guide means 67 for the expeller device 68.

According to other embodiments, between the assembly exit station 38 and the entrance station 41 for the intermediate combination 11a, there can advantageously be alignment and guide devices 69 configured to keep the assembly 11, partly wrapped by the wrapping sheet 112, aligned during its introduction into the gripping member 70.

The alignment and guide devices 69 can comprise a fixed guide member 69a, disposed aligned laterally between the chamber 50 of the respective pocket 40 and the gripping member 70.

According to a variant, with every transfer of an intermediate combination 11a, one or more mobile guide members 69b move adjacent to the two sides of the gripping member 70 used to accommodate the intermediate combination 11a, thus defining a guide for the lateral walls 16b of the structured assembly 11.

In particular, the mobile guide member 69b can act against the lateral fins 16b of the reinforcement insert 16, keeping it adherent to the smoking articles 14, so as to keep the structured assembly 11 compact.

According to some embodiments, the wrapper work unit 32 comprises a second conveyor device 71 provided with a plurality of gripping members 70.

According to possible solutions, the second conveyor device 71 can comprise a wheel 72 provided with a plurality of gripping members 70 on its periphery.

According to possible variants, the second conveyor device 71 can be a linear carousel or a pocket conveyor.

Hereafter, in the description we will refer by way of example to a wheel 72, configured to rotate step-wise around a vertical axis of rotation Y, generating a work path L.

The work path L, in the form shown by way of example in FIG. 1, cooperates with the formation path F so as to align the structured assembly exit station 38 of the structured assembly formation unit 30 to the corresponding entrance station 41 of the intermediate combination 11a into the wrapping sheet work unit 32.

The second conveyor device 71 provides to move the gripping member 70 from the entrance station 41 to the welding station 42, and subsequently to the definitive folding station 44.

According to some embodiments, the gripping member 70 has a fixed base plane 80 and an upper plane 81 elastically pressed above the intermediate combination 11a, so as to keep in position the components of the intermediate combination 11a laterally as well.

According to some embodiments, the base plane 80 includes lateral retaining elements 82, configured to retain laterally at least the lateral walls 16b of the intermediate combination 11a.

The base plane 80 advantageously includes guide means 83 for an extractor element 85 that operates when the pre-wrapper 12a is defined.

According to some embodiments, the guide means 83 can be defined by a slit that passes longitudinally through the base plane 80.

According to other embodiments, the guide means 83 can also cooperate with the counter-thruster possibly present in correspondence with the entrance station 41 during the introduction of the intermediate combination 11a into the gripping member 70.

According to some embodiments, the upper plane 81 is associated with elastic members 84 that exert an elastic force upon it, keeping it pressed toward the intermediate combination 11a.

According to possible solutions, the elastic members 84 can exert a fixed elastic pressure, or adjustable in relation to the operations that are carried out on the intermediate combination 11a.

According to possible variants, the elastic pressure can be possibly cancelled during the extraction of the pre-wrapper 12a and/or the introduction of the intermediate combination 11a.

According to possible embodiments, the gripping member 70 can comprise a fixed abutment plane 86, attached to the horizontal wheel 72, on which the elastic members 84 that act against the upper gripping plane 81 are attached.

According to some embodiments, the fixed abutment plane 86 can be associated with actuator members, not shown, configured to open in a desired manner the upper gripping plane 81, for example in correspondence with the entrance station 41 and the exit station 44, to facilitate respectively the introduction of the intermediate combination 11a and the extraction of the pre-wrapper 12a.

In the welding station 42 the lower flap 24 and the upper flap 25 of the wrapping sheet 112 are associated and welded to each other as shown in FIG. 5b, defining a transverse edge 28 and obtaining the manipulable whole 11b.

According to some embodiments, the transverse edge 28 is substantially aligned with the upper side 18 of the manipulable whole 11b.

According to a variant, the two protruding flaps 24, 25 of the wrapping sheet 112 can be folded and then welded in any other useful shape whatsoever.

Figure 11:
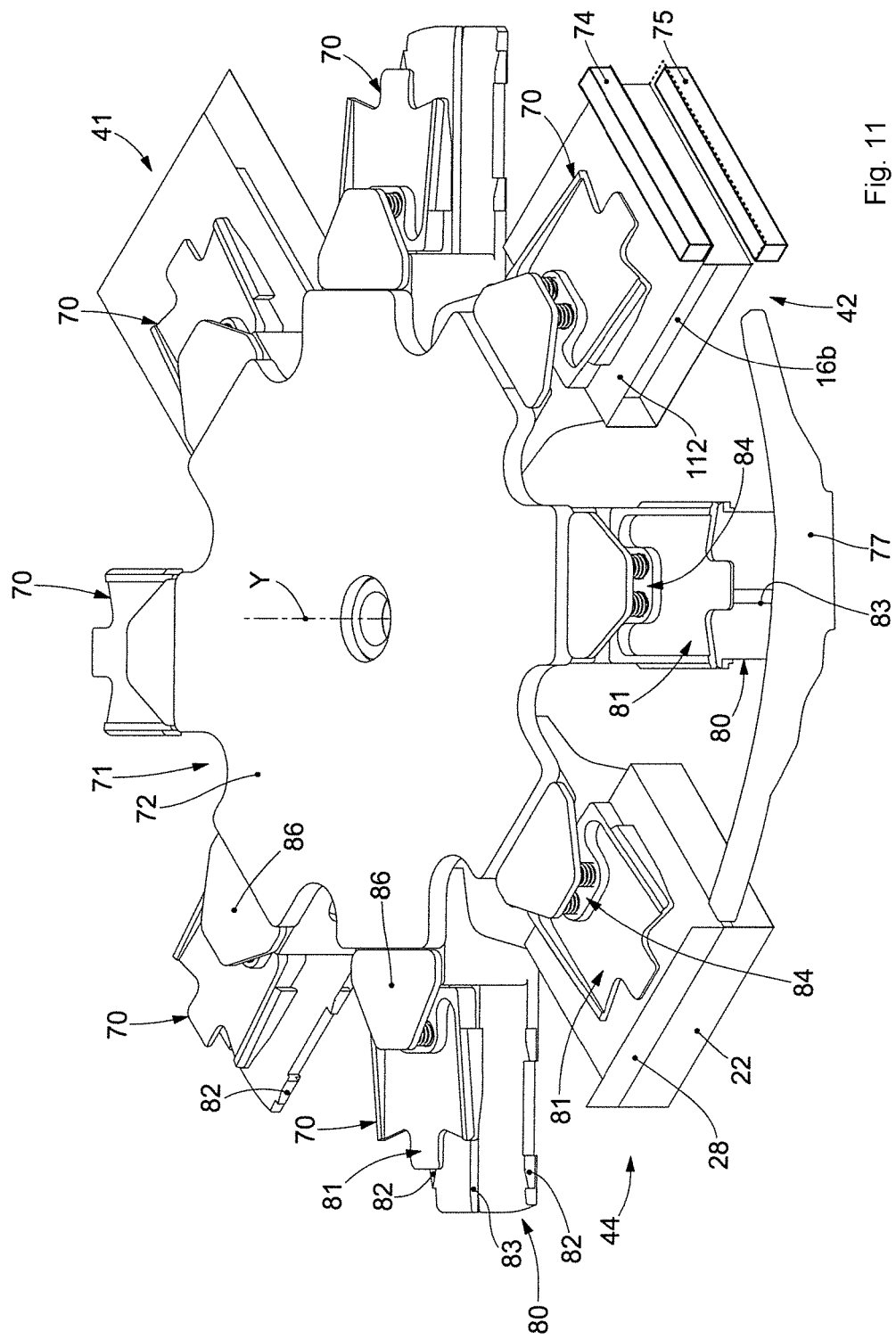
FIG. 11 is a schematic view of a part of the machine in FIG. 1 in which the gripping members are visible.

According to some embodiments, described for example with reference to FIG. 11, the welding station 42 is provided with a pair of welding devices 74, 75 including an upper welding device 74 and a lower welding device 75, which act on the intermediate combination 11a retained by the gripping member 70.

The upper welding device 74 can advantageously be fixed, as in the case shown here, while the lower welding device 75 can be mobile between a position of non-interference with the wrapping sheet 112 and a position in which it interferes with the lower flap 25, keeping it near to the dedicated bottom wall 14c and at the same time bringing it closer to the upper flap 24 and to the upper welding device 74, so as to obtain the transverse edge 28 and the manipulable whole 11b.

Finally, the second conveyor device 71 can transfer the gripping member 70 with the respective manipulable whole 11b, taking it to cooperate with the definitive folding station 44, in which all the foldings of the wrapping sheet 112 are completed, around the structured assembly 11, suitable to define the pre-wrapper 12a ready for the subsequent sealing operation.

According to some embodiments, between the welding station 42 and the definitive folding station 44a cam 77 can be provided, configured to interfere with the already welded transverse edge 28 of the manipulable whole 11b during its transfer to the folding station 44, and to raise it to the desired position.

If the transverse edge 28 is coherent with the upper side 18 of the manipulable whole 11b, it is put vertical, that is, orthogonal to the upper side 18 of the manipulable whole 11b.

Figure 10:
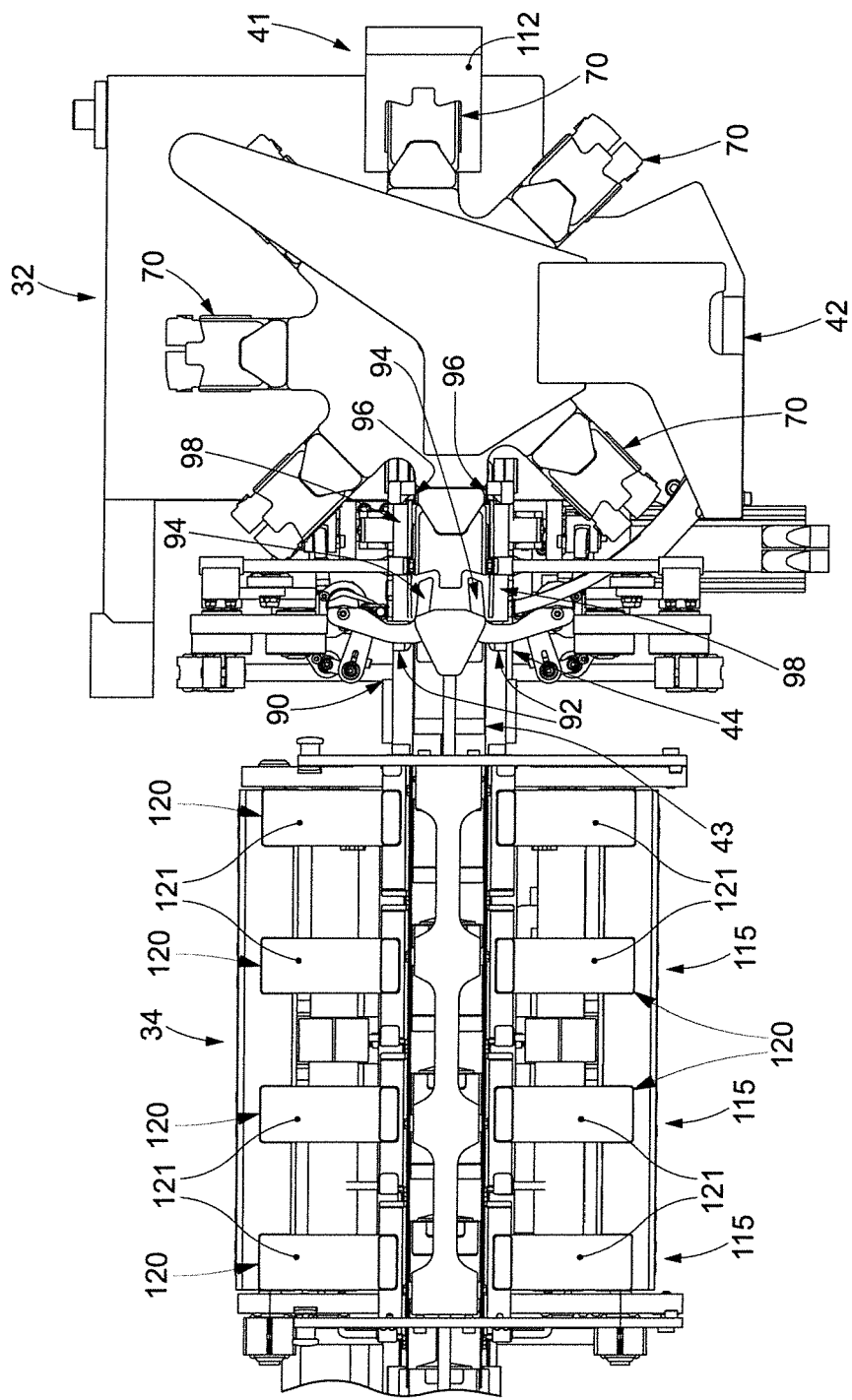
FIG. 10 is a schematic view from above of a part of the machine in FIG. 1.

According to embodiments described here with reference to FIG. 10, and combinable with the other embodiments described here, the folding station 44 comprises a folding device 90 configured to make all the foldings of the manipulable whole 11b propaedeutic to the subsequent welding, obtaining a pre-wrapper 12a.

Figure 12:
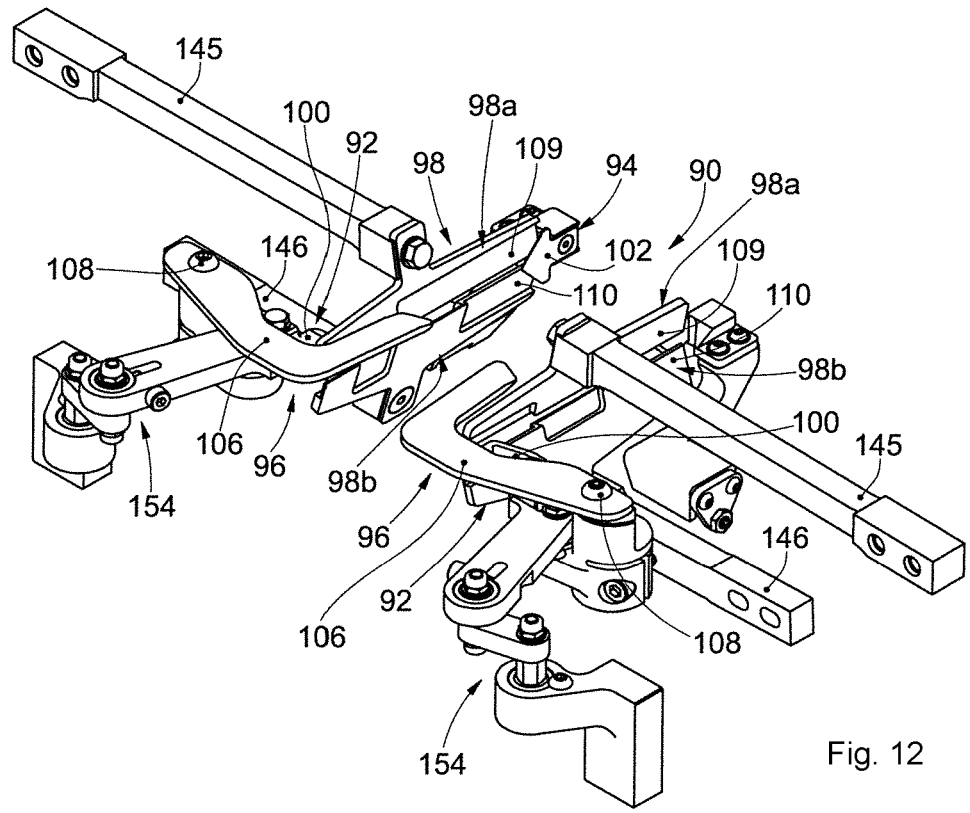
FIG. 12 is a schematic perspective view of a folding device in accordance with embodiments of the present invention.
Figure 13:
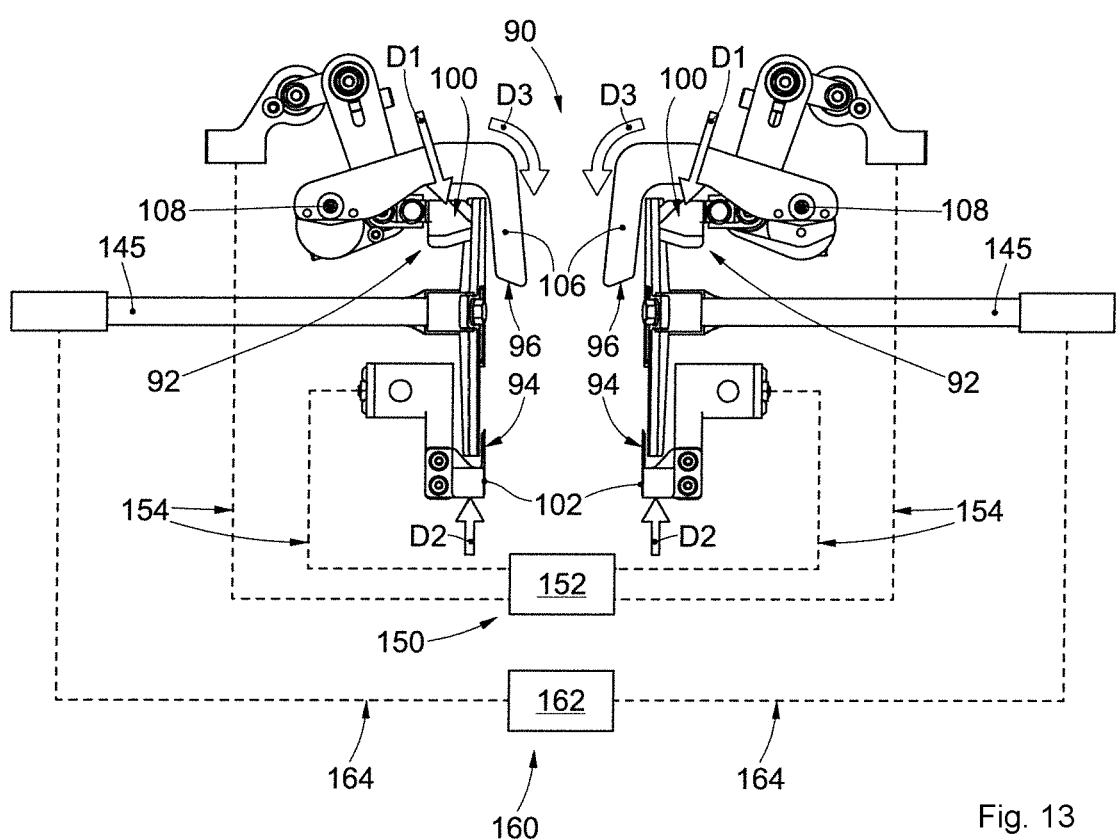
FIG. 13 is a plan view from above of the detail in FIG. 12.

According to embodiments described here with reference to FIGS. 12-13, the folding device 90 comprises a plurality of folding members 92, 94, 96, 98, organized in specialized pairs, each pair being suitable to carry out a specific folding of the wrapping sheet 112 around the structured assembly 11, obtaining the pre-wrapper 12a.

The folding device 90 comprises a pair of front folders 92 and a pair of rear folders 94, configured respectively to fold the portions of the lateral flaps 26, 27 projecting laterally in a transverse direction from the structured assembly 11, making them adhere to the lateral walls 16b of the reinforcement insert 16.

Advantageously, according to a possible solution, the folding device 90 also comprises a pair of upper folders 96, configured to fold the welded transverse edge 28, taking it into contact with the upper side 18 of the manipulable whole 11b.

The folding device 90 also comprises two pairs of lateral folders 98, each consisting of an upper lateral folder 98a and a lower lateral folder 98b, configured to act against the longitudinal lateral flaps 20 of the wrapping sheet 112 that protrude beyond the lateral walls 16b of the structured assembly 11, and to obtain the transverse layers 29.

According to some embodiments, the front folders 92 and/or the rear folders 94 advantageously have a substantially triangular shape in the zone that contributes to folding.

According to some embodiments, the front folders 92 can comprise a front thruster element 100, advantageously wedge-shaped, provided with triangular edges suitable to interfere with the lateral flaps 26 of the wrapping sheet 112 and to take them into contact with the lateral walls 16b, defining substantially triangular folds.

According to some embodiments, the front thruster element 100 is mobile on a horizontal lying plane and is configured to act against the lateral flap 26 in an inclined direction indicated by arrows D1 in FIG. 13 (see also FIG. 5c).

According to some embodiments, the rear folders 94 can comprise a rear thruster element 102 mobile on a vertical lying plane laterally adjacent to the gripping member 70.

The rear thruster element 102 is configured to translate in a direction D2, parallel to the longitudinal development of the gripping member 70, indicated by arrows D2 in FIG. 13, to define a substantially triangular fold of the lateral flap 27, taking it into contact with the lateral walls 16b (see FIG. 5c).

According to possible solutions, shown by way of example in FIGS. 12 and 13, the rear thruster element 102 is substantially shaped like an arrow or a triangle, with the point facing toward the front folders 92.

The height of the rear thruster element 102 is advantageously correlated to the height of the lateral fins 16b of the reinforcement insert 16 along which the lateral flaps 27 are taken into contact.

The arrow shape of the rear thruster element 102 advantageously allows to make a triangular fold defined in correspondence with the part of the airtight wrapper 12 which, once finished and packed in a packet, will be visible to the user.

According to some embodiments, shown by way of example in FIGS. 12-13, the upper folders 96 comprise an upper thruster element 106 mobile on a horizontal lying plane. The horizontal lying plane on which the upper thruster element 106 moves is substantially parallel to the upper side 18 of the manipulable whole 11b.

According to some embodiments, shown by way of example in FIGS. 12-13 and combinable with the embodiments described above, the upper thruster element 106 is L-shaped, with a first end constrained rotatably to a pin 108, and a second end able to interfere with the transverse edge 28.

According to some embodiments, the upper thruster element 106 can rotate, or in any case move, in the direction indicated by arrows D3 in FIG. 13.

According to other embodiments, combinable with all the embodiments described here, the upper 98a and lower 98b lateral folders comprise respective transverse blades 109, 110 configured to act on the upper and lower longitudinal lateral flaps 20 of the wrapping sheet 112 and on the transverse flap 28.

The transverse blades 109, 110 can be connected to respective drive arms 145, 146, configured to move the transverse blades 109, 110, moving them closer to or away from each other.

According to some embodiments, the lateral folders 98 have the respective transverse blades 109, 110 inclined so as to converge toward each other toward the lateral walls 16*b* of the reinforcement insert 16 and hence the manipulable whole 11*b*.

Their angled position allows the lateral folders 98 to thrust the longitudinal lateral flaps 20 to adhere with the structured assembly 11, using the reinforcement insert 16 as an element to determine the longitudinal folding edges.

According to other embodiments, the lateral folders 98 and the base plane 80 and the upper plane 81 of the gripping member 70 can have protrusions and recesses coordinated to obtain optimum folds.

Furthermore, the lateral folders 98 can be shaped with hollows and protrusions so as to define housing seatings for the front folders 92 and the rear folders 94 in the respective folding positions.

According to some embodiments, described with reference to FIG. 13 and combinable with the other embodiments, the folding device 90 comprises a first drive unit 150 configured to drive at least the front folders 92.

According to possible embodiments, the first drive unit 150 can be configured to also drive the rear folders 94 and the upper folders 96 at the same time as the front folding members 92.

According to a possible embodiment, the upper folders 96 can be driven in an integrated manner with the front folders 92.

The first drive unit 150 can comprise a first drive member 152 and one or more first motion transfer units 154 configured to transfer the motion generated by the drive member 152 to the respective folders 92, 94, 96.

According to possible embodiments, the first motion transfer units 154 can comprise joints, cam members, return members, pins and/or similar or comparable components.

According to some embodiments, described with reference to FIG. 13 and combinable with the other embodiments, the folding device 90 comprises a second drive unit 160 configured to drive the lateral folding members 98.

The second drive unit 160 can comprise a second drive member 162 and a second motion transfer unit 164 configured to transfer the motion generated by the drive member 162 to the upper and lower folders 98*a*, 98*b*.

According to possible variant embodiments, the folding members 92, 94, 96, 98 can be driven singly.

In the folding station 44 the following operations in particular are performed on the manipulable whole 11*b*.

The upper and lower lateral folders 98 that cooperate with the longitudinal lateral flaps 20 of the wrapping sheet 112 are positioned above and below the longitudinal lateral flaps 20 with an angle opening with respect to the manipulable whole 11*b*.

In the same way, the front 92 and rear 94 folders are positioned in relation to the four flaps 26, 27 of the transverse lateral walls 21, 22 in a position suitable to operate in pairs against each other in extreme nearness to the longitudinal lateral flaps 20.

At the same time the upper folders 96 can be positioned.

When the front 92, rear 94, upper 96 and lateral 98 folders are in the start-of-folding position, and the manipulable whole 11*b* is correctly positioned between them, in the example shown here the following steps take place:
the welded transverse edge 28 is folded by another 90° until it rests against the upper side 18 of the manipulable whole 11*b*;
then the front 92 and rear 94 folders intervene to define the folded angles of the wrapping sheet 112, generating substantially triangular folds;
with a slight delay the upper and lower lateral folders 98 then intervene, which fold the longitudinal lateral flaps in pairs, obliging them to join, in this case, substantially in the vertical half of the manipulable whole 11*b*, obtaining the longitudinal layers 29 extending from the structured assembly 11.

According to some embodiments, until the lateral folders 98 have finished their function, the front 92, rear 94 and upper 96 folders advantageously remain in position.

According to other embodiments, the lateral folders 98, during folding, advantageously do not completely close, so as not to ruin the wrapping sheet 112, and at the same time to perform the positioning and guide function during the subsequent transfer.

The not totally closed position is advantageous during the extraction of the pre-wrapper 12*a*, since the lateral folders 98 function as a guide and to keep the folded longitudinal layers 29 in position.

When the folds have been made, the upper folders 96 and front 92 and rear 94 folders retract, while the lateral folders 98 remain in the folding position.

In this way the pre-wrapper 12*a* is obtained, with the longitudinal layers 29 already defined and ready for subsequent welding to make the airtight wrapper 12.

Figure 5G:
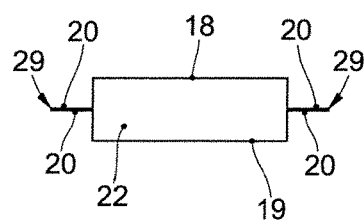

Once folding is terminated, the pre-wrapper 12*a* is transferred to the welding unit 34 where welding devices 120 provide to weld the longitudinal layers 29 (see FIG. 5*g*).

According to a variant, the intermediate station 43 is present between the folding station 44 and the welding unit 34 to better define the longitudinal layers 29.

The intermediate station 43 in practice has guide members 114 to position and move the longitudinal layers 29 nearer both to each other and also to the structured assembly 11 during the action of the expeller 85 that expels the pre-wrapper 12*a* from the gripping member 70, delivering it to the welding unit 34.

The intermediate station 43 can comprise a transit channel 115 provided with guide members 114 obtained with the lateral walls of the transit channel 115.

According to some embodiments, the guide members 114 can comprise a fissure, possibly provided in the entrance direction with a flared or spread portion, able to define a lead-in to facilitate the introduction of the longitudinal layers 29 of the pre-wrapper 12*a*.

According to possible solutions, the intermediate station 43 can comprise heating devices, not shown, suitable to heat to a desired temperature the longitudinal layers 29 of the pre-wrapper 12*a* associated with each other, so as to facilitate the subsequent welding.

According to some embodiments, the welding unit 34 comprises at least one welding station 115 that has a welding device 120 for each side of the pre-wrapper 12*a*.

Each welding device 120 comprises a pressure welding member 121 and a regulated counter-pressure welding member 122.

According to some embodiments, the pressure welding member 121 and the counter-pressure welding member 122 have sizes coherent with the length and width of the longitudinal layers 29 to be welded.

To increase the productive capacity of the machine 10, multiple identical stations can be provided, or the functions of one station can be diluted in several stations.

The number of welding stations 115 is not determined only by the production capacity, but also by the welding cycle-time that is to be set and/or by the type of wrapping sheet 112 and hence its welding requirements.

If there are two or more welding stations 115, the pre-wrapper 12a is advantageously delivered by the folding station 44 on a suitable transfer belt 130 which takes the individual pre-wrapper 12a and feeds the individual welding stations 115 in sequence.

Advantageously, as well as the intermediate station 43, between one welding station 115 and the next guide members 132 can be provided for the longitudinal layers 29, so as to guarantee the correct positioning thereof in their transit from one welding device 120 to the other.

The welding device 120 comprises presser members 134 connected to the pressure welding members 121 and configured to move the pressure welding members 121 with a defined and adjustable travel according to a desired and set cycle.

The welding device 120 also comprises members defining the contrast pressure 136, connected to the counter-pressure welding members 122, configured to position and set the counter-pressure welding members 122 to a defined counter-pressure force.

If there are several welding stations 115, there can be a single contrast presser member 136 for all the welding stations 115, or a single one for each station 115.

The means that determine the pressure 134 and the counter-pressure 136 can be hydraulic, pneumatic, oil-dynamic or mechanical means.

Figure 14:
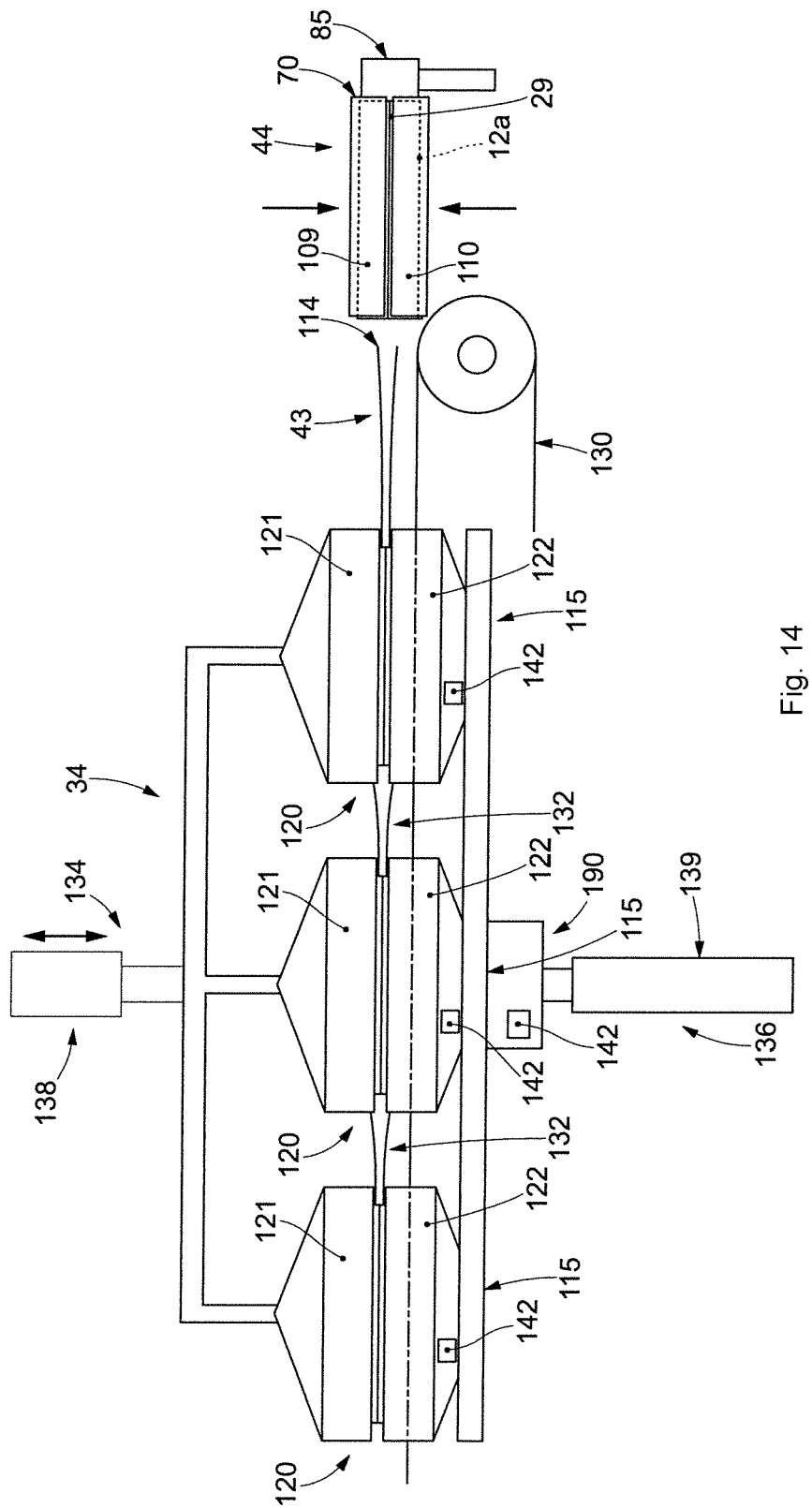
FIG. 14 is a schematic lateral view of a welding unit in accordance with embodiments of the present invention.
Figure 15:
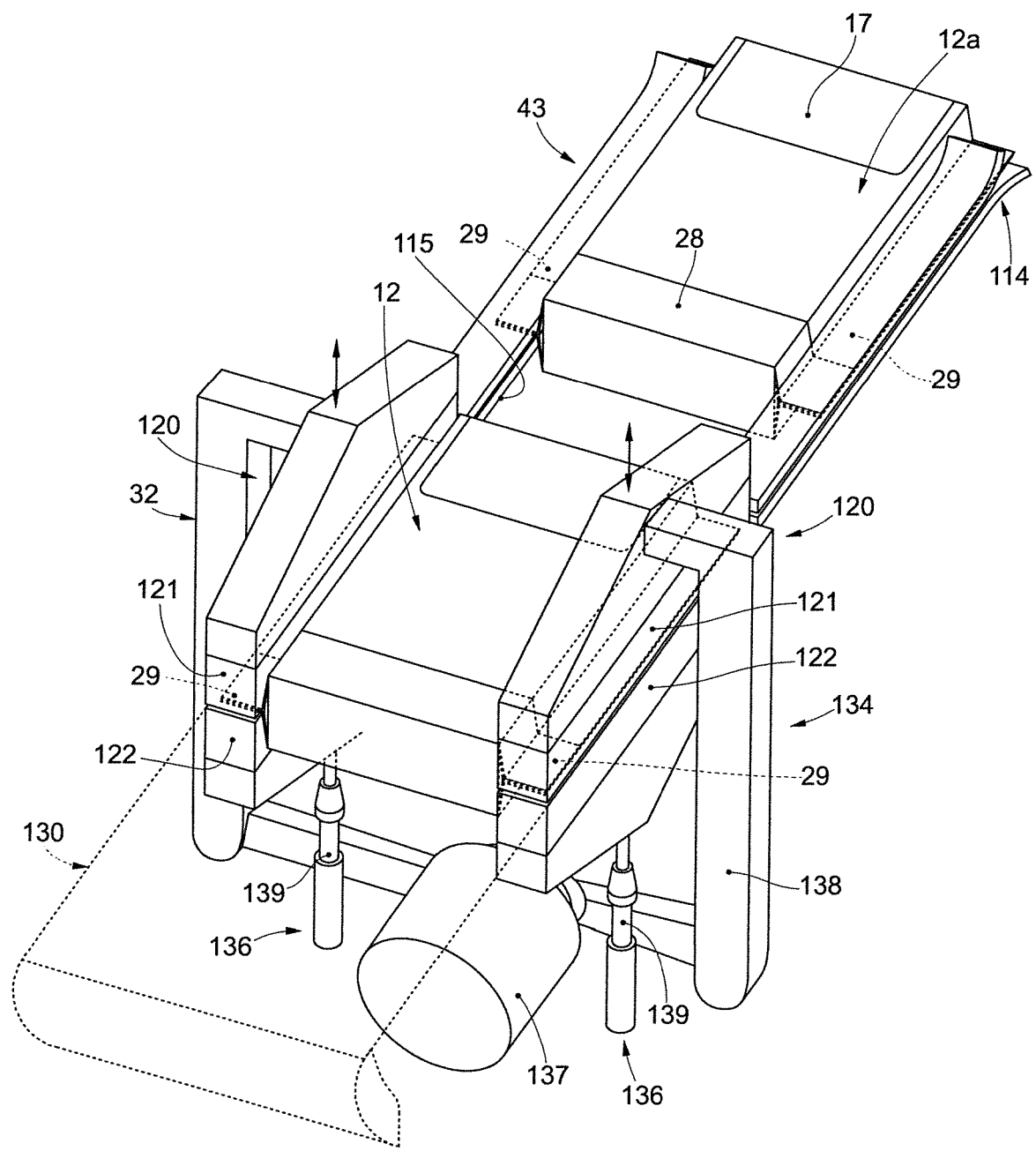
FIG. 15 is a schematic perspective view of a welding unit in accordance with other embodiments of the present invention.

According to some embodiments, shown for example in FIGS. 14 and 15, the presser members 134 can comprise a drive member 137 and motion transfer devices 138 that act on the pressure welding member 121.

According to possible embodiments, shown by way of example in FIG. 15, the motion transfer devices 138 can comprise eccentric devices, cam or rod/crank systems, or parallelogram systems.

According to possible solutions, the contrast presser member 136 connected to the counter-pressure welding member 122 can have an adjustable elastic contrast.

According to some solutions, the contrast presser member 136 can be associated with a pneumatic 139 or hydraulic device According to possible variants, not shown, the contrast presser member 136 can comprise spring means able to exert a desired counter-pressure force.

It should be noted that a slight displacement of the counter-pressure welding member 122, even if negligible, serves to control the pressure applied by the pressure welding member 121.

In this way it is certain that, with a desired tolerance, the load applied by the pressure welding member 121 on the counter-pressure welding member 122 essentially balances the pressure force set by the contrast presser member 136.

According to some embodiments, detection devices 142 can be provided, associated with the contrast presser members 136 and/or the counter-pressure welding member 122, configured to detect the displacement of the latter following the compression exerted by the pressure welding member 121.

The detection devices 142 can be disposed in correspondence with each counter-pressure welding member 122, or in correspondence with the contrast presser members 136.

According to some embodiments, it can be provided that, if there is a stoppage of the packaging machine 10, the welding members 120 are de-activated and distanced from the product to be welded. In this way the stationary product runs no risk of being damaged.

According to possible variant embodiments, not shown, the welding unit 32 can comprise induction welding devices, which allow to weld more quickly.

It is clear that modifications and/or additions of parts may be made to the functional units, devices and methods as described heretofore, without departing from the field and scope of the present invention.

It is also clear that, although the present invention has been described with reference to some specific examples, a person of skill in the art shall certainly be able to achieve many other equivalent forms of functional units, devices and methods, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A packaging machine to make an airtight wrapper comprising a wrapping sheet wrapped airtight around a structured assembly consisting of an organized group of smoking articles associated with a reinforcement insert, the machine comprising:

a structured assembly formation unit comprising a formation pocket configured as a chamber with a lower wall, an upper wall and lateral walls, and which is configured to house the structured assembly said chamber having a first introduction mouth and a second introduction mouth disposed opposite one another, the chamber configured to allow the structured assembly to pass through;

a combination unit configured to combine the structured assembly with said wrapping sheet, with or without a reusable closing label, in order to obtain an intermediate combination of the wrapping sheet and the structured assembly;

a first welding station, in which a first folding of the wrapping sheet is made along a longitudinal axis around the structured assembly, said first welding station being configured to weld respective upper and lower edges of the wrapping sheet thereby defining a welded transverse edge to obtain a manipulable whole;

a wrapping unit comprising a gripping member configured to hold the manipulable whole, and a folding station provided with a folding device with folding members, configured to fold at least longitudinal lateral flaps of the wrapping sheet, in order to obtain a pre-wrapper provided with longitudinal tabs;

a welding unit, having a second welding station provided with welding devices configured to weld the pre-wrapper at least along the longitudinal tabs in order to complete their welding, obtaining a closed and sealed airtight wrapper;

wherein the chamber is provided with spreader members configured to keep lateral walls of the reinforcement insert spreading out with respect to a base wall of the reinforcement insert, when the structured assembly formed by the reinforcement insert and the smoking articles is housed within the chamber of the formation pocket; and wherein said formation pocket is provided with lateral positioning means configured to keep the spread out lateral walls of the reinforcement insert aiming toward said upper wall of the chamber by an angle of greater than 90° with respect to the base wall.

2. The packaging machine as in claim 1, wherein said first introduction mouth and said second introduction mouth are coaxial, and wherein said spreader members are provided adjacent said second introduction mouth.

3. The packaging machine as in claim 1, wherein said lateral positioning means comprise lateral projections located inside said chamber and protruding progressively toward said first introduction mouth.

4. The packaging machine as in claim 1, including an introduction base in said chamber adjacent to said second mouth and provided with introduction seatings positioned to align with the smoking articles.

5. The packaging machine as in claim 1, including base positioning means in said chamber, the base positioning means configured to position the base wall of the reinforcement insert such that it does not interfere during the introduction of the smoking articles.

6. The packaging machine as in claim 5, wherein said base positioning means comprise a lower positioning base disposed at a distance from the lower wall of said chamber to define an interspace sized to receive an end part of said base wall of the reinforcement insert, said lower positioning base being coordinated with introduction seatings of an introduction base in said chamber.

7. The packaging machine as in claim 5, wherein said base positioning means further comprises at least one of blades or shaped needles, the blades or shaped needles being positioned at said second introduction mouth and positioned in a contact zone between one smoking article and another.

8. The packaging machine as in claim 1, and wherein there is an upper positioning base in said chamber in correspondence with said first introduction mouth, the upper positioning base provided with positioning seatings arranged to align with the smoking articles.

9. The packaging machine as in claim 1, and including guide means for an expeller device are provided in said lateral walls of said chamber.

10. The packaging machine as in claim 1, wherein said upper wall and said lower wall have a reduced thickness adjacent to the first introduction mouth.

11. The packaging machine as in claim 1, and wherein said combination unit comprises a feed member of a wrapping sheet positioned outside said formation pocket adjacent to said first introduction mouth, and an expeller device configured for expelling the structured assembly from said pocket and combining the structured assembly with the wrapping sheet to obtain the intermediate combination, wherein alignment and guide devices are provided to keep the intermediate combination aligned during the transfer from said pocket to said wrapping unit, wherein the feed member further includes arms to position the wrapping sheet in a desired position in relation to said first introduction mouth, said arms being configured to position said wrapping sheet in a desired manner relative to the structured assembly exiting from said chamber.

12. The packaging machine as in claim 11, wherein said structured assembly comprises a head wall, a bottom wall, and first and second base walls, wherein said wrapping sheet comprises an upper flap and a lower flap and a lower wall, and wherein said wrapping sheet is positioned, in relation to said structured assembly, such that the lower wall is associated with said bottom wall, the upper flap extends beyond an edge of the first base wall and in continuity with the first base wall and the lower flap extends beyond the edge of the second base wall and in continuity the second base wall.

13. The packaging machine as in claim 1, wherein said gripping member of the wrapper unit has an upper plane subjected to elastic members acting toward a fixed base plane, the upper plane and the base plane being equipped to contain and position the intermediate combination.

14. A packaging machine to make an airtight wrapper comprising a wrapping sheet wrapped airtight around a structured assembly consisting of an organized group of smoking articles associated with a reinforcement insert, the machine comprising:

a structured assembly formation unit comprising a formation pocket configured as a containing chamber with a lower wall, an upper wall and lateral walls, and which is configured to house the structured assembly, said containing chamber having a first introduction mouth and a second introduction mouth configured to be crossed through by the structured assembly, and placed opposite each other;

a combination unit configured to combine the structured assembly with said wrapping sheet, with or without a reusable closing label, in order to obtain an intermediate combination of the wrapping sheet and the structured assembly;

a first welding station, in which a first folding of the wrapping sheet is made along a longitudinal axis around the structured assembly, said first welding station being configured to weld respective upper and lower edges of the wrapping sheet, defining a welded transverse edge, to obtain a manipulable whole;

a wrapping unit comprising a gripping member configured to hold the manipulable whole, and a folding station provided with a folding device configured to fold both transverse lateral flaps and longitudinal lateral flaps of the wrapping sheet, in order to obtain a pre-wrapper provided with longitudinal tabs;

a welding unit having a second welding station provided with welding devices configured to weld the pre-wrapper at least along the longitudinal tabs in order to complete welding thereof and obtain a closed and sealed airtight wrapper, wherein the folding device for operating on the manipulable whole comprises:

a pair of front folders, configured to act on opposite front lateral flaps of the wrapping sheet;

a pair of rear folders, configured to act on opposite rear lateral flaps of the wrapping sheet;

a pair of upper folders configured to act on the welded transverse edge;

two pairs of lateral folders configured to act on respective opposite longitudinal lateral flaps defining the longitudinal tabs.

15. The packaging machine as in claim 14 wherein said front folders and/or said rear folders have a triangular shape in a zone that contributes to the folding, and wherein said front folders each comprise a front thruster element that is mobile on a horizontal plane.

16. A method of operating the packaging machine as in claim 1, including forming said structured assembly inside the chamber of the formation pocket, introducing the reinforcement insert into said chamber through the first introduction mouth, and subsequently introducing the organized group of smoking articles through the second introduction mouth, said method further including expelling the structured assembly through said first introduction mouth.

17. The method of operating the packaging machine as in claim 16, wherein the intermediate combination is obtained by combining the structured assembly with the wrapping sheet, obtaining the intermediate combination during axial translation of the structured assembly from the formation pocket to the gripping member.

18. The method of operating the packaging machine as in claim 17, including providing said structured assembly with a head wall, a bottom wall, and first and second base walls, providing said wrapping sheet with an upper and a lower flap and a lower wall, and positioning said wrapping sheet, in relation to said structured assembly, such that the lower wall is associated with said bottom wall, with the upper flap extending beyond an edge of the first base wall and in continuity with the first base wall, and with the lower flap extending beyond the edge of the second base wall and in continuity the second base wall.

19. The method of operating the packaging machine as in claim 18, wherein during an insertion of the intermediate combination into said gripping member, an expeller device of the combination unit thrusts said intermediate combination.

20. The method of operating the packaging machine as in claim 19, wherein said expeller device expels the pre-wrapper.

21. The method of operating the packaging machine as in claim 16, wherein in the folding station the following operations are carried out:

folding the welded transverse edge by means of upper folders, taking the welded transverse edge into contact with a front lateral wall of the manipulable whole;

refolding opposite lateral flaps of the wrapping sheet projecting laterally in a transverse direction from the structured assembly, and making triangular folds by means of front and rear folders;

folding and bringing closer together the opposite longitudinal lateral flaps of the wrapping sheet that protrude transversely above and below the structured assembly, bringing the opposite longitudinal lateral flaps adjacent to said triangular folds on said lateral walls and making respective longitudinal tabs that extend orthogonal to said lateral walls by means of lateral folders.

22. The method for operating the packaging machine as in claim 21, including driving said front, rear and upper folders at the same time, and then subsequently driving said lateral folders.

* * * * *